United States Patent [19]

Boratgis et al.

[11] 4,313,308

[45] Feb. 2, 1982

[54] TEMPERATURE CONTROL WITH UNDERCOOL PROTECTION

[76] Inventors: James P. Boratgis, Lee Hill Rd.; Earle S. Pittman, 2269 Mariposa, both of Boulder, Colo. 80302

[21] Appl. No.: 184,965

[22] Filed: Sep. 8, 1980

[51] Int. Cl.³ .................. F25B 49/00; F25B 29/00
[52] U.S. Cl. ........................... 62/126; 62/127; 165/11 R; 165/26
[58] Field of Search .......... 62/126, 127, 160, 229; 165/11 R, 26; 236/94

[56] References Cited

U.S. PATENT DOCUMENTS

| | | | |
|---|---|---|---|
| 4,034,570 | 7/1977 | Anderson et al. | 62/158 |
| 4,187,093 | 2/1980 | Boratgis et al. | 62/126 |
| 4,240,077 | 12/1980 | Hughes et al. | 62/126 X |

*Primary Examiner*—William E. Wayner

*Attorney, Agent, or Firm*—Ancel W. Lewis, Jr.

[57] ABSTRACT

Electronic control apparatus is disclosed for automatically controlling the operation of refrigeration units on truck-drawn trailers which includes an undercool comparator (240) connected to a resistor (239) in a voltage divider including a temperature selector (13) and having its output in parallel with an overcool comparator (44), either of which will actuate a malfunction indicator (15) in the event of undercooling or overheating conditions during a chilled food setting for the temperature selector (13). An overcool comparator (91) that is turned on when the selector (13) is moved to a frozen food mode operates a control element in the form of a transistor (99) that serves to disable the output of overcool comparator (240) and prevent the actuation of the heat load device (23) by effecting grounding connections in the circuit.

11 Claims, 1 Drawing Figure

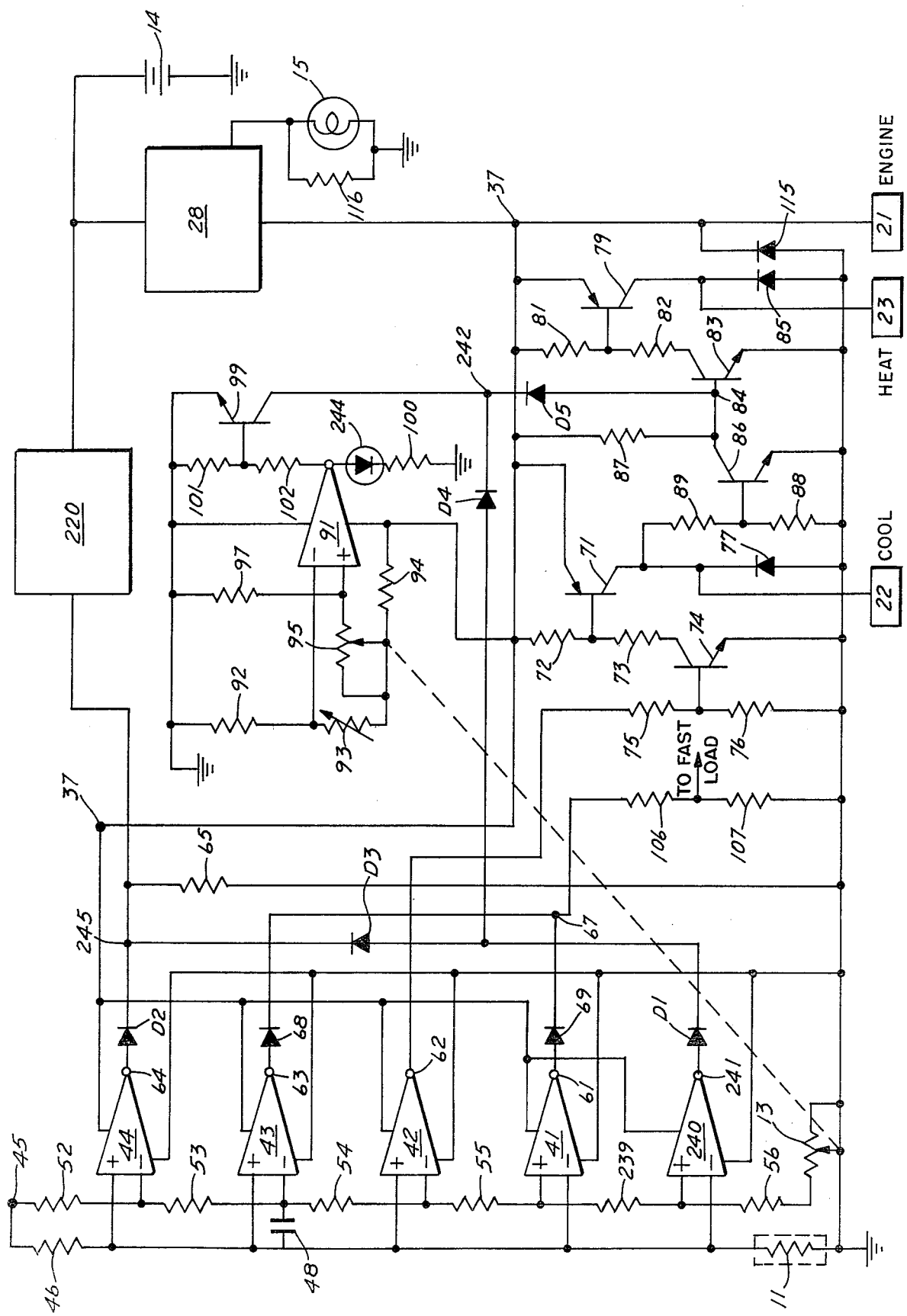

TEMPERATURE CONTROL WITH UNDERCOOL PROTECTION

TECHNICAL FIELD

This invention relates to temperature control and malfunction signal apparatus with undercool protection that is particularly suited for refrigeration units in trailer truck vehicles and the like.

BACKGROUND ART

Truck-drawn trailers equipped with refrigeration units require a high degree of reliability, as is discussed in our U.S. Pat. No. 4,187,093. In said patent there is disclosed a novel and improved solid state temperature control and malfunction signal apparatus utilizing a voltage divider to establish a plurality of temperature reference points and this voltage divider operates independently of the temperature sensor. The circuit shown and described therein is particularly effective for detecting and producing a warning signal to prevent an overheat situation to prevent damage to the cargo due to overheating.

In temperature controls for trailer-equipped refrigeration units it is important to operate the unit within a desired temperature range. In the event the cooling unit should stick and continue to cool below a desired temperature, there would be necessary energy expended and in some instances this may cause damage to certain types of cargo, making it desirable to detect an overcool malfunction. To this end, in accordance with the present invention there is provided a novel and improved temperature control circuit that will detect and signal overcooling malfunction, preferably using the same signal device for signaling either an overheat or an overcool malfunction situation.

DISCLOSURE OF INVENTION

In accordance with the present invention there is provided a resistor in the voltage divider and an associated overcool comparator that senses overcool temperatures for one mode of operation, which typically is during the chilled food mode. The comparator is connected in parallel with an overheat comparator and both are connected to a malfunction indicator so that, in the event of either overheat or overcool, a malfunction warning signal is produced. The overcool comparator is operatively associated with a low temperature control circuit for another mode of operation, which typically is a frozen food mode, in such a way as to ensure that any output from the overcool comparator during this frozen food mode does not trigger the malfunction warning signal.

BRIEF DESCRIPTION OF DRAWING

The details of this invention will be described in connection with the accompanying drawing, in which:

The single FIGURE is a circuit diagram embodying features of the present invention.

DETAILED DESCRIPTION

Referring now to the drawing, as was shown and described in detail in our above-mentioned previous patent a temperature sensor 11 in the form of an electric resistor is connected in series with resistor 46 in a sensing branch of a circuit connected between power terminal 45 and ground. The temperature reference branch is formed by a series of resistors 52, 53, 54, 55 and 56 forming a voltage divider with associated comparators 41, 42, 43 and 44, respectively.

Briefly, this voltage divider is a temperature reference means that establishes a plurality of temperature reference points at selected increments above and below a set point. This temperature reference means operates independently of the temperature sensor 11. The reference branch also includes the temperature selector 13 in the form of a variable resistor in series with resistors 52–56 arranged so that a change in the setting of selector 13 automatically adjusts the temperature reference points of the voltage divider a proportional amount.

The control circuits and load devices that are actuated by the operation of comparators 41–44 are the same as those shown and described in our previous patent. Briefly, the output of the overheat comparator 44 is connected to the input of the Darlington circuit 220 and, when the temperature in the chamber rises to a selected maximum temperature reference point above the set point (typically 10° F. above a setting of 35° F. for a chilled food mode of operation), the malfunction light 15 is turned on. The fast cool comparator 43 operates to produce an output signal when the temperature reaches a selected temperature increment above the set point (typically 2° F. above). The fast cool comparator 43 produces a signal at the output 63 that is applied across resistors 106 and 107 and ultimately operates a "fast" load device (not shown), which is a solenoid or the like, to effect a fast cool operation.

The on-cool comparator 42 operates at a temperature above, but less than a selected temperature increment (typically 2° F.) above, the set point to provide a signal at the output 62 that turns on transistors 74 and 71 to actuate the cool load device 22. An intermediate control transistor 86 is on when transistor 71 is on and operates to make sure the power is off to the heat load device 23 when it is on to the cool load device 22, and vice versa; the heat load device 23 remains normally on and turns off only when the cool load device 22 is on.

When the temperature falls below, but less than 2° F. below, the setting of selector 13, comparator 42 turns off causing the cool load device 22 to turn off and the heat load device 23 to turn on effecting slow heat. If the temperature should continue to fall more than a selected increment below the set temperature (typically 2° F.), the fast heat comparator 41 is turned on to effect the fast heat mode. Above 2° F. below the setting, the fast load device is not operated but transistor 79 stays on until comparator output 62 turns transistor 71 on when the temperature in the chamber reaches above, but less than 2° F. above, the set point.

For a low temperature mode of operation, which is commonly referred to as the "frozen food mode" (typically 15° F.), there is provided the comparator 91 with associated resistors and the variable resistor 95 that is ganged to control resistor 13. When the resistor 13 is set to this low temperature range of operation, comparator 91 is turned on and a LED 244 connected to the output indicates that the frozen food mode has been set.

The collector side of transistor 99 is designated by numeral 242. Transistor 99 is turned on for conduction between the emitter-collector junction when the low temperature comparator 91 is on. When transistor 99 is on, this grounds the base of transistor 83 and turns off the transistor 79 controlling the heat load device 23.

The circuit shown in the drawing is simplified from that shown in our above-mentioned previous patent in that certain portions have been shown in block diagram form. The Darlington circuit using transistors 121, 122 and 123 and the capacitor 117 and associated resistors and capacitors is represented as a single block designated by numeral 220. Similarly, the solid state relay 28 is shown as a single block designated by that numeral which controls the actuation of the malfunction indicator 15. Battery 14 is shown connected to both the solid state relay 28 and the Darlington circuit 220. Other portions of the circuit not directly connected to the circuitry of the present invention also have not been shown, to avoid unnecessary duplication and confusion.

In the circuit shown, the undercool protection circuit includes a resistor 239 connected in the voltage divider between resistors 55 and 56 and an overcool comparator 240 arranged with one input connected to sensor 11 and the other input connected between resistor 239 and resistor 56. The value of this resistor 239 in the voltage divider is selected to provide a minimum temperature reference point below the set point (typically 5° F. below) and at that temperature the comparator 240 will produce an output signal at 241.

The output 64 of overheat comparator 44 is shown connected via a diode D2 to the input of the Darlington circuit 220 and the output of overcool comparator 240 is connected via diodes D1 and D3 to this same terminal designated by numeral 245 so that the outputs of comparators 240 and 44 are connected in parallel with the input of the Darlington circuit 220 and either operates to trigger the Darlington circuit 220 independently of the other during the chilled food mode described herein.

The output 241 of the overcool comparator 240 is further connected via diode D1 and a diode D4 to the collector electrode of transistor 99 at a terminal designated 242, which in turn is connected via diode D5 to terminal 84 at the base of transistor 83 and the collector of control transistor 86.

Diode D3 being connected between diode D2 and terminal 242 isolates the output of overheat comparator 44 from transistor 99. Diode D4 prevents the plus level of voltage at terminal 84, which occurs when transistor 86 is off during the on-heat operation, from reaching the Darlington circuit via diode D3.

Diode D5 prevents the output of the overcool comparator 240 from reaching terminal 84, particularly when transistor 86 is on during the on-cool operation and terminal 84 is substantially at ground level.

Diodes D1 and D2 isolate the output of comparators 44 and 241, respectively, from each other. Diode D1 isolates the output of comparator 240 from any plus level of voltage on the cathode side of diode D1 and diode D2 isolates comparator 44 from any plus level of voltage on the cathode side of diode D2.

OPERATION

When the momentary switch in block 28 is pressed, SCR 31 (not shown) in block 28 is on until a malfunction occurs. The charging capacitor in the Darlington circuit 220 is in the charged state. At temperatures of 10° F. and above the set point, overheat comparator 44 operates to trigger the Darlington circuit 220 and in turn turn on malfunction lamp 15. At temperatures greater than 2° F. above the set point, comparator 43 operates; at temperatures above the setting of control 13 comparator 42 operates, and at temperatures greater than 2° F. below the setting of control 13 comparator 41 operates as above described.

During the chilled food mode (about 35° F.), if the cooling cycle gets stuck the cool load device 22 continues to be actuated. Under these conditions undercool comparator 240 produces a signal which is coupled through diodes D1 and D3 to the Darlington circuit 220 to turn on the indicator light 15 to indicate a malfunction.

isolates the output of comparator 240 from terminal 84, since conduction of transistor 86 could prevent the output from comparator 240 from reaching the Darlington circuit 220. During the on-cool mode, transistor 86 is on and this turns off transistor 83 to remove the power from the heat load device 23.

During the frozen food mode, the power to the heat load device 23 is clamped off via the operation of comparator 91 and conduction of transistor 99 by grounding the base of transistor 83 at terminal 84. During this condition the conduction of transistor 86 has no effect, and during this condition comparator 91 turns the LED 244 on to indicate that they are operating in the frozen food mode.

During the frozen food mode the conduction of transistor 99 takes place and the output of overcool comparator 240 is connected to ground via transistor 99, so no signal from comparator 240 can reach the Darlington circuit.

In summary, in the frozen food mode of operation the Darlington circuit 220 can only receive a signal from overheat malfunction comparator 44, whereas in the chilled food mode of operation the Darlington circuit 220 can receive a signal from either the overheat comparator 44 or the overcool comparator 240. Transistor 99 serves the dual function of grounding the output of the overcool comparator 240 and grounding terminal 84 to prevent the heat load device 23 from operating.

Although the present invention has been described with a certain degree of particularity, it is understood that the present disclosure has been made by way of example and that changes in details of structure may be made without departing from the spirit thereof.

What is claimed is:

1. In refrigerator electronic control apparatus for controlling the temperature in and providing a malfunction signal for a refrigeration unit associated with a refrigerated chamber, the combination comprising:
   temperature sensor means for said chamber;
   temperature selector means for said chamber having a range of temperature settings; and
   electronic circuit means including:
   temperature reference means operatively associated with said temperature selector means, said temperature reference means establishing a plurality of temperature reference points at selected temperature increments above and below a set point,
   a comparator associated with each of said temperature reference points, each comparator responsive to an output of the associated set point and to an output of said temperature sensor means, and
   control means including a plurality of solid state control elements, each control element responsive to an output of one of said comparators for alternately effecting the actuation of a heat load device in said refrigeration unit when the temperature in said chamber is a selected temperature increment below said set point and effecting the actuation of a cool load device in said refrigeration unit when the temperature in said chamber is a selected temperature increment above said set point to automatically maintain the temperature in said chamber within a selected temperature range and for also effecting the actuation of a malfunction indicator and disabling a prime mover load device to stop said refrigeration unit in the event of a malfunction in said refrigeration unit when the temperature in said chamber exceeds a selected maximum temperature reference point above said set point and, in the alternative, when the temperature in said chamber exceeds a selected minimum temperature reference point below said set point in a first operating mode, there being shut-off means operatively associated with said temperature selector means including a control element for disabling any heating operation by said refrigeration unit when said temperature is below a selected low temperature and for preventing the actuation of said malfunction indicator due to an undercool condition when the temperature in said chamber exceeds said selected minimum temperature reference point below said set point in a second operating mode, said selected low temperature being below said selected minimum temperature reference point.

2. In apparatus as set forth in claim 1 wherein there is an overheat comparator and an overcool comparator arranged with their outputs connected in parallel with one another and connected to actuate the malfunction indicator so that either can effect the actuation of said malfunction indicator.

3. In apparatus as set forth in claim 2 wherein said shut-off means includes a control element that both effects the turn-off of heat to the refrigeration unit and at the same time prevents the actuation of a malfunction indicated by said undercool comparator.

4. In apparatus as set forth in claim 3 wherein said shut-off means includes a low temperature comparator that is turned on by the movement of said selector means to a low temperature setting, said low temperature comparator turning on said control element.

5. In apparatus as set forth in claim 2 including blocking means to block any output from said overheat comparator from affecting the operation of said control element.

6. In apparatus as set forth in claim 2 including blocking means to block any output signal from said overcool comparator from reaching an intermediate control element that controls the operation of the cool load device and the heat load device so that when one is on the other is off and vice versa.

7. In apparatus as set forth in claim 2 including blocking means to block any voltage at the control element for the cool and heat load devices from affecting an output from said overheat comparator to the malfunction indicator.

8. In apparatus as set forth in claim 1 including blocking means at the outputs of each of said undercool and overheat comparators to isolate the outputs of each from the other.

9. In apparatus as set forth in claim 1 wherein said first operating mode is a chilled food mode with a set point at about 35° F.

10. In apparatus as set forth in claim 1 wherein said first operating mode is a frozen food mode with a set point at about 15° F.

11. In refrigerator electronic control apparatus for controlling the temperature in and providing a malfunction signal for a refrigeration unit associated with a refrigerated chamber, the combination comprising:
temperature sensor means in the form of a resistor that varies with temperature for said chamber;
temperature selector means in the form of a variable resistor for said chamber having a range of temperature settings; and
electronic circuit means including:
 temperature reference means in the form of a voltage divider operatively associated with said temperature selector means, said temperature reference means establishing a plurality of temperature reference points at selected temperature increments above and below a set point,
 a comparator associated with each of said temperature reference points, each comparator responsive to an output of the associated set point and to an output of said temperature sensor means,
 control means including a plurality of solid state control elements, each control element responsive to an output of one of a first, second and third of said comparators for alternately effecting the actuation of a heat load device in said refrigeration unit when the temperature in said chamber is a selected temperature increment below said set point and effecting the actuation of a cool load device in said refrigeration unit when the temperature in said chamber is a selected temperature increment above said set point to automatically maintain the temperature in said chamber within a selected temperature range, there being an undercool and an overcool comparator for effecting the actuation of a malfunction indicator and disabling a prime mover load device to stop said refrigeration unit in the event of a malfunction in said refrigeration unit when the temperature in said chamber exceeds a selected maximum temperature reference point above said set point due to an overheat condition and, in the alternative, when the temperature in said chamber exceeds a selected minimum temperature reference point below said set point due to an overcool condition in a first operating mode, there being shut-off means including a low temperature comparator operatively associated with said temperature selector means having a control element operated by said low temperature comparator for disabling any heating operation by said refrigeration unit when said temperature is below a selected low temperature and for preventing the actuation of the malfunction indicator due to an undercool condition when the temperature in said chamber exceeds said selected minimum temperature reference point below said set point in a second operating mode, said selected low temperature being below said selected minimum temperature reference point,
 a blocking diode for preventing any output from said overheat comparator from affecting the operation of said control element,
 a blocking diode for preventing any output signal from said overcool comparator from reaching an intermediate control element, a blocking diode for preventing any voltage at the control element for the cool and heat load devices from affecting an output from said overheat comparator to the malfunction indicator, and a blocking diode at the outputs of each of said undercool and overheat comparators to isolate the outputs of each from the other.

* * * * *